(12) United States Patent
Coleman et al.

(10) Patent No.: US 6,754,957 B2
(45) Date of Patent: Jun. 29, 2004

(54) FABRICATED VEHICLE WHEEL AND METHOD FOR PRODUCING THE SAME

(75) Inventors: Alan Coleman, Southgate, MI (US); Robert Raymond, Novi, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/161,404

(22) Filed: May 31, 2002

(65) Prior Publication Data

US 2003/0080606 A1 May 1, 2003

Related U.S. Application Data (60) Provisional application No. 60/338,539, filed on Oct. 30, 2001.

(51) Int. Cl.[7] .............................. B60B 3/10; B21K 1/34; B23P 17/00
(52) U.S. Cl. ............................. 29/894.344; 29/894.323; 301/64.101
(58) Field of Search ....................... 301/63.101, 63.102, 301/64.101, 67, 80; 29/894.322, 894.323, 894.325, 894.342, 894.344, 894.34

(56) References Cited

U.S. PATENT DOCUMENTS

| | | | | |
|---|---|---|---|---|
| 1,473,406 A | * | 11/1923 | Harroun | 301/64.101 |
| 1,601,628 A | * | 9/1926 | Kranz | 301/64.101 |
| 1,677,104 A | * | 7/1928 | Reaney | 301/64.101 |
| 1,682,715 A | * | 8/1928 | Watrous | 301/64.101 |
| 2,041,657 A | * | 5/1936 | Hight | 29/894.344 |
| 2,047,137 A | * | 7/1936 | Eksergian | 301/35.59 |
| 2,073,924 A | * | 3/1937 | Eksergian | 29/894.344 |
| 2,083,229 A | * | 6/1937 | Horn et al. | 29/894.325 |
| 2,100,885 A | * | 11/1937 | Trumble | 29/894.344 |
| 2,120,633 A | * | 6/1938 | Sinclair | 29/894.344 |
| 2,187,032 A | * | 1/1940 | Horn et al. | 301/64.101 |
| 3,346,301 A | * | 10/1967 | Hurst, Jr. et al. | 301/65 |
| 3,874,054 A | * | 4/1975 | Reppert | 29/894.325 |
| 4,256,347 A | * | 3/1981 | Reppert | 301/64.101 |
| 4,319,785 A | * | 3/1982 | Sato et al. | 301/6.3 |
| 5,533,260 A | * | 7/1996 | Kier, Jr. | 29/894.322 |
| 6,042,194 A | | 3/2000 | Fitz et al. | |
| 6,244,669 B1 | | 6/2001 | Braunschweiler | |
| 2002/0003374 A1 | | 1/2002 | Braunschweiler | |

FOREIGN PATENT DOCUMENTS

| | | |
|---|---|---|
| EP | 0 935 536 | 12/2001 |
| WO | 98/19874 | 5/1998 |
| WO | 99/65709 | 12/1999 |

* cited by examiner

Primary Examiner—Russell D. Stormer
(74) Attorney, Agent, or Firm—MacMillan, Sobanski & Todd, LLC (57) ABSTRACT

This invention relates to an improved fabricated vehicle wheel and method for producing the same. The method for producing the fabricated vehicle wheel includes the steps of: (a) providing a wheel rim defining a rim axis and including an inboard tire bead seat retaining flange, an inboard tire bead seat, a generally axially extending well portion, an outboard tire bead seat and an outboard tire bead seat retaining flange; (b) providing a wheel disc blank; (c) subjecting the wheel disc blank to a metal forming operation to produce a partially formed wheel disc having a plurality of outwardly extending spoke portions which are spaced circumferentially about the disc blank; (d) subjecting the partially formed wheel disc to a metal forming operation to produce a wheel disc preform, the wheel disc preform including an inner mounting portion, a plurality of outer spoke portions, and an intermediate spoke portion defined in the region between the inner mounting portion and outer spoke portions, the intermediate spoke portion including a plurality of generally globe shaped spoke portions; (e) subjecting the wheel disc preform to one or more metal forming operations to produce a finished wheel disc, the finished wheel disc including a centrally located wheel mounting surface and a plurality of outwardly extending spokes; and (f) securing the wheel disc and the wheel rim together to produce the fabricated vehicle wheel.

20 Claims, 12 Drawing Sheets

FABRICATED VEHICLE WHEEL AND METHOD FOR PRODUCING THE SAME

CROSS-REFERENCE TO RELATED APPLICATIONS

This application claims the benefit of U.S. Provisional Application Serial No. 60/338,539, filed Oct. 30, 2001.

BACKGROUND OF THE INVENTION

This invention relates in general to vehicle wheels and in particular to an improved fabricated vehicle wheel and method for producing the same.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

A fabricated vehicle wheel is shown in U.S. Pat. No. 6,042,194 to Fitz et al. As shown in the embodiment illustrated in FIGS. 4 and 5 of the Fitz et al. patent, the wheel includes an outer full rim and an inner one piece disc having a plurality of spoke members. Each spoke member includes an outer end which is welded to the rim to produce the vehicle wheel. The Fitz et al. patent discloses other embodiments of a wheel construction having individual spoke members which are secured to the rim in a similar manner.

SUMMARY OF THE INVENTION

This invention relates to an improved fabricated vehicle wheel and method for producing the same. The method for producing the fabricated vehicle wheel comprises the steps of: (a) providing a wheel rim defining a rim axis and including an inboard tire bead seat retaining flange, an inboard tire bead seat, a generally axially extending well portion, an outboard tire bead seat and an outboard tire bead seat retaining flange; (b) providing a wheel disc blank; (c) subjecting the wheel disc blank to a metal forming operation to produce a partially formed wheel disc having a plurality of outwardly extending spoke portions which are spaced circumferentially about the disc blank; (d) subjecting the partially formed wheel disc to a metal forming operation to produce a wheel disc preform, the wheel disc preform including an inner mounting portion, a plurality of outer spoke portions, and an intermediate spoke portion defined in the region between the inner mounting portion and outer spoke portions, the intermediate spoke portion including a plurality of generally globe shaped spoke portions; (e) subjecting the wheel disc preform to one or more metal forming operations to produce a finished wheel disc, the finished wheel disc including a centrally located wheel mounting surface and a plurality of outwardly extending spokes; and (f) securing the wheel disc and the wheel rim together to produce the fabricated vehicle wheel.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
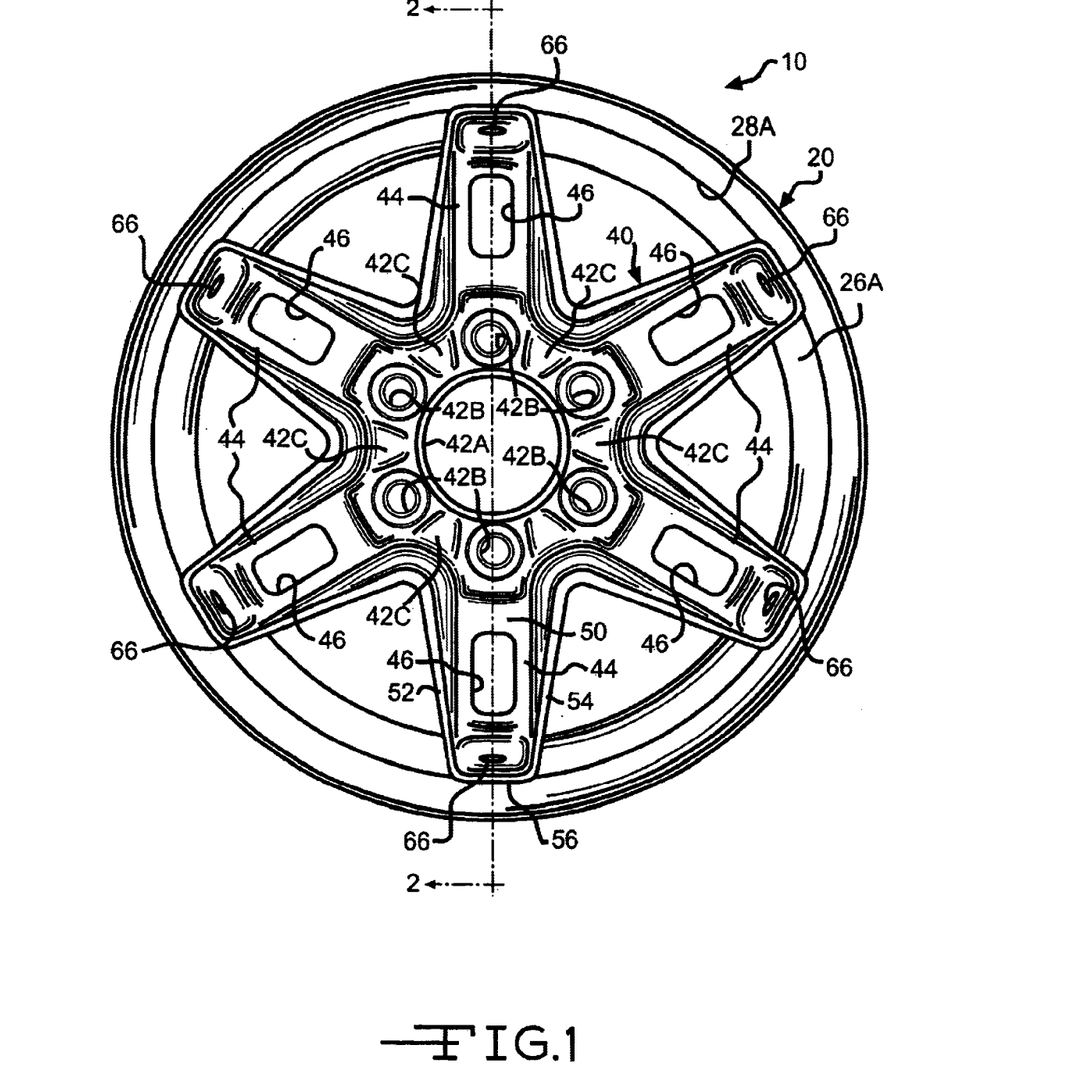
FIG. 1 is a front view of a fabricated vehicle wheel produced in accordance with the present invention.
Figure 2:
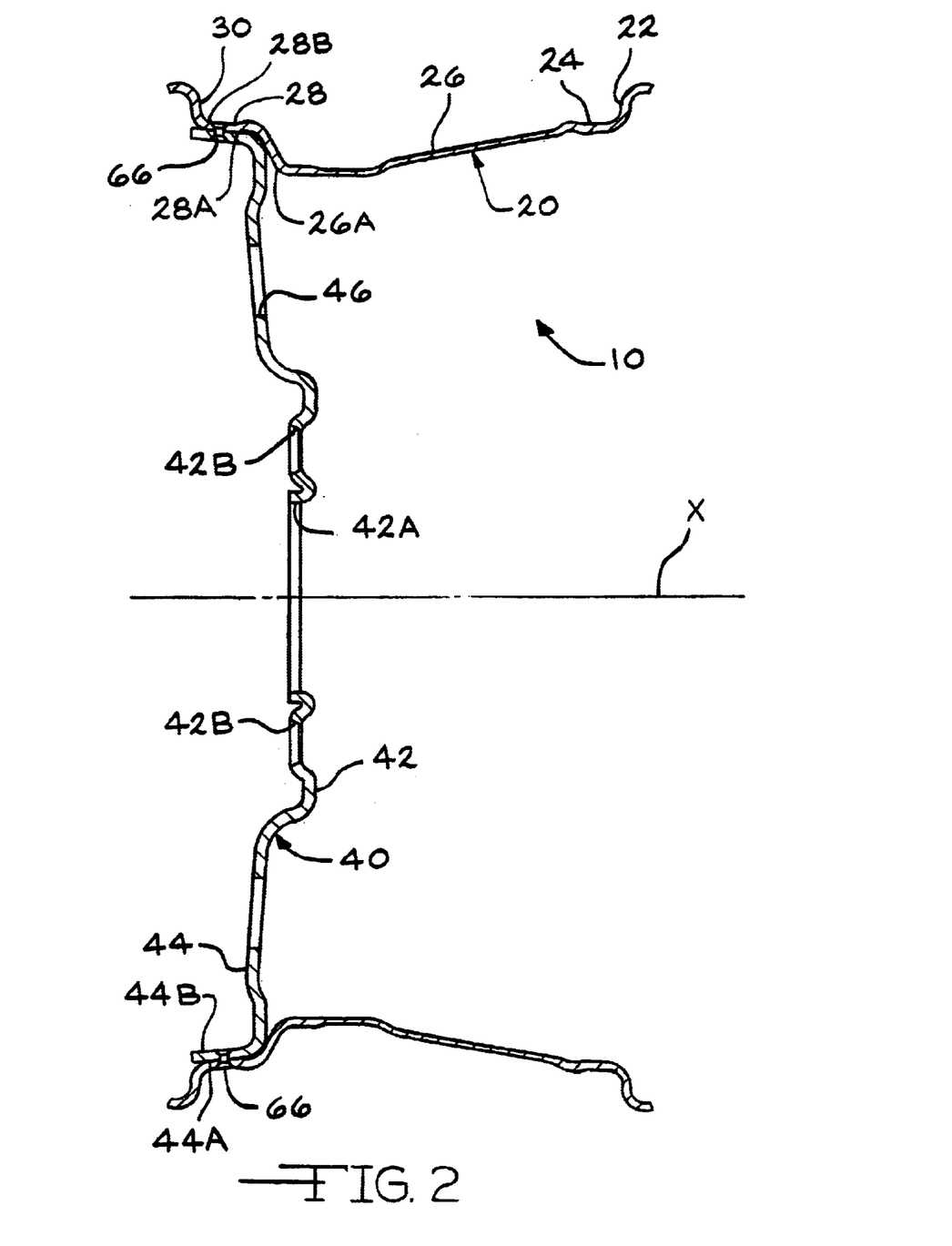
FIG. 2 is a sectional view of the fabricated vehicle wheel taken along line 2—2 of FIG. 1.
Figure 3:
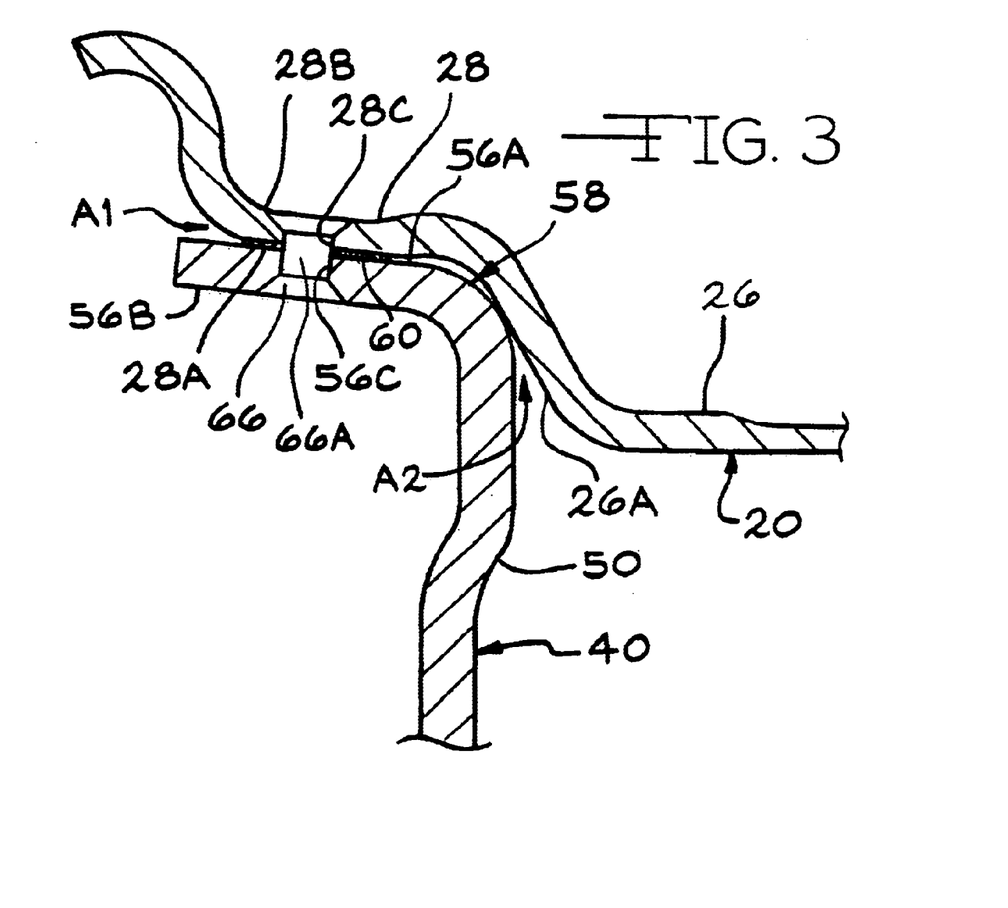
FIG. 3 is an enlarged view of a portion of the fabricated vehicle wheel illustrated in FIGS. 1 and 2.

Referring now to the drawings, FIGS. 1 through 3 illustrate a fabricated vehicle wheel, indicated generally at 10, produced in accordance with the present invention. The fabricated vehicle wheel 10 produced according to this invention is illustrated as being a fabricated "bead seat attached" vehicle wheel. The fabricated bead seat attached vehicle wheel 10 includes a full wheel rim 20 and an inner wheel disc 40 which are constructed and joined together in accordance with the present invention. The fabricated bead seat attached vehicle wheel 10 of the present invention defines a horizontal or longitudinal vehicle wheel axis X. Although the present invention is illustrated and described in conjunction with the particular vehicle wheel constructions disclosed herein, it will be appreciated that the invention can be used in conjunction with other types of vehicle wheel constructions. For example, the vehicle wheel can be a "drop center" or "well-attached" vehicle wheel (such as shown in FIG. 3 of U.S. Pat. No. 5,188,429 to Heck et al.), the disclosures of these patents incorporated herein by reference.

The wheel rim 20 is a fabricated rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, an outboard tire bead seat 28, and an outboard tire bead seat retaining flange 30. The well 26 includes an outer surface 26A and the outboard tire bead seat 28 includes an outer surface 28A and an inner surface 28B. The outboard tire bead seat 28 further includes a plurality of holes 28C (best shown in FIG. 3), formed therein for a purpose to be discussed below. The holes 28C can be formed by a suitable process, such as for example, by piercing, drilling or laser cutting.

As will be discussed below, the wheel disc 40 is fabricated in accordance with the present invention and is formed from a suitable material, such as for example, steel, magnesium, titanium, aluminum or alloys thereof. The wheel disc 40 includes a generally centrally located wheel mounting surface or portion 42 and a plurality of outwardly extending spokes 44. In the illustrated embodiment, the disc 40 includes six of such spokes 44 which are shown as being formed integral with the wheel mounting surface 42. Alternatively, the number and/or the construction of the spokes 44 can be other than illustrated if so desired. For example, the vehicle wheel 10 can include less than six spokes 44 or more than six spokes 44 and/or the spokes 44 can be formed separate from the wheel mounting surface 42 of the disc 40 and joined thereto by a suitable method.

The wheel mounting surface 42 is provided with a centrally located pilot aperture 42A and a plurality of lug bolt receiving holes 42B circumferentially spaced around the pilot aperture 42A. In the illustrated embodiment, the wheel mounting surface 42 includes six of such lug bolt receiving holes 42B which are preferably provided in the wheel mounting surface 42 "in line" with a respective one of each of the spokes 44. Alternatively, the number and/or the location of the lug bolt receiving holes 42B can be other than illustrated if so desired. The lug bolt receiving holes 42B receive lug bolts (not shown) and nuts (not shown) for securing the vehicle wheel 10 on an axle (not shown) of a vehicle.

The mounting surface 42 further includes a plurality of "strengthening" ribs 42C provided therein. In the illustrated embodiment, a rib 42C is located between each pair of lug bolt receiving holes 42B. Each of the ribs 42C is defined by a raised or embossed area which extends outwardly from or above the mounting surface 42. The ribs 42C are operative to strengthen the mounting surface 42 to keep it from flexing during vehicle operation thereby improving the fatigue life of the associated vehicle wheel. Alternatively, the spacing, location, number and/or configuration of the ribs 42C can be other than illustrated and described if so desired.

Each of the spokes 44 includes an inner surface 44A and an outer surface 44B. The wheel disc 40 may also include one or more openings or windows 46 formed in one or more of each of the spokes 44. In the illustrated embodiment, one of such windows 46 is provided in each of the spokes 44. Alternatively, the number and/or the location of the windows 46 can be other than illustrated if so desired.

Each spoke 44 of the wheel disc 40 includes a generally flat rear or back wall 50, a pair of opposed side walls 52 and 54 extending outwardly from the rear wall 50, and an outermost end wall 56 extending outwardly from the rear wall 50 which defines a mounting flange. The side walls 52 and 54 are operative to connect the associated spoke 44 to the wheel mounting surface 42 thereof. In the illustrated embodiment, the side walls 52 and 54 extend generally radially inwardly or non-parallel to one another and define a non-uniform or varying spoke width therebetween. Alternatively, the structure of one or both of the spoke side walls 52 and 54 can be other than illustrated if so desired.

The mounting flange 56 includes an inner surface 56A and an outer surface 56B. The mounting flange 56 of each spoke 44 is connected to the rear wall 50 by a transition portion 58. The transition portion 58 has a generally curved or rounded profile which generally corresponds to the profile of the adjacent outer surface 28A of the wheel rim 20 to which it is joined. The inner surface 56A of the mounting flange 56 of the spoke 44 and the outer surface 28A of the rim 20 define a first disc to rim interface area, indicated generally at A1, and an inner surface 58A of the transition portion 58 and the outer surface 26A of the rim 20 define a second disc to rim interface area, indicated generally at A2. Preferably, there is full or complete contact between the inner surface 56A of the mounting flange 56 of the spoke 44 and the outer surface 28A of the rim 20 at the first disc to rim interface area A1, and there is also full contact between the inner surface 58A of the transition portion 58 and the outer surface 26A of the rim 20 at the second disc to rim interface area A2. However, due to manufacturing tolerances and/or other design specifications, there may be less than full contact at one or both of the interface areas A1 and A2. In the illustrated embodiment, the mounting flange 56 of each spoke 44 is provided with a hole 56C for a purpose to be discussed below.

To assemble the vehicle wheel 10 in the illustrated embodiment, a suitable adhesive 60 is preferably first applied to the inner surface 56A of each spoke. A suitable adhesive is a one part epoxy available under the name BETAMATE® 4601, manufactured by Dow Chemical Company of Midland, Mich. Alternatively, the type and/or the application of the adhesive 60 can be other than illustrated and described if so desired. For example, the adhesive 60 can be applied to the outer surface 28A of the rim 20.

Next, the wheel rim 20 and the wheel disc 40 are located relative to one another in a predetermined position. In this position, the wheel rim outer surface 28A disposed adjacent the spoke flange inner surface 56A and with the rim outer surface 26A disposed adjacent the spoke transition inner surface 48A. While in this position, the wheel rim holes 28C and the spoke flange holes 56C are preferably formed in the rim 20 and spokes 44 at the same time by a suitable method, such as for example, by piercing, drilling or laser cutting. Forming the holes 28C and 56C in this manner ensures that the holes 28C and 56C are in proper alignment. Next, a suitable fastener 66 is installed in each of the aligned holes 28C and 56C to thereby join the wheel rim 20 and the wheel disc 40 together. Alternatively, the holes 28C and 56C can be separately provided in one or both of the rim 20 and spokes 44 prior to assembly if so desired.

In the illustrated embodiment, the fastener 66 is a rivet and includes a generally round body 66A. As best shown in FIG. 3, the holes 28C and 56C are preferably countersunk so that when the rivet 66 is installed no portion of the rivet 66 protrudes outside of the respective surfaces 28B and 56B of the wheel rim 20 and the wheel disc 40. Alternatively, the type, configuration, location and/or the number of fasteners 66 that are used can be other than illustrated if so desired. Also, as shown in this embodiment, preferably the inner surface 58A of the transition portion 58 and the outer surface 26A of the wheel rim well 26 abut or contact one another at the second disc to rim interface area A2; however, in some instances, depending upon the uniformity of the rim 20 and/or the disc 40 or depending upon the particular vehicle wheel construction, the inner surface 58A and the outer surface 26A may not abut or contact one another along portions thereof or at all.

Figure 4:
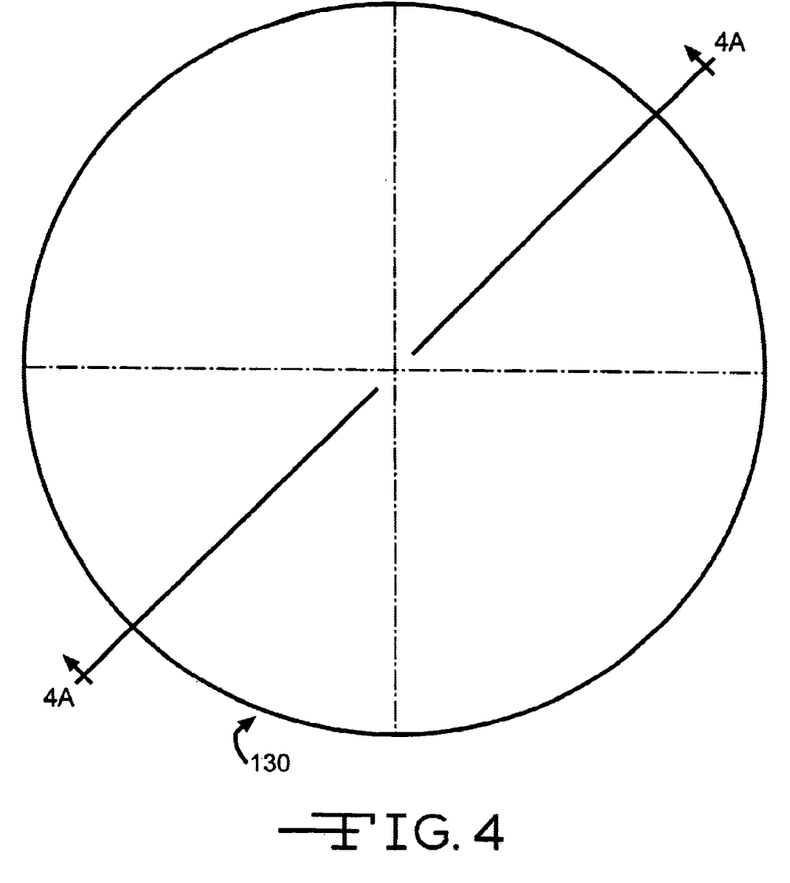
FIG. 4 is a plan view showing the initial stamping of a sheet of metal material in order to produce a wheel disc blank in accordance with this invention.
Figure 4A:
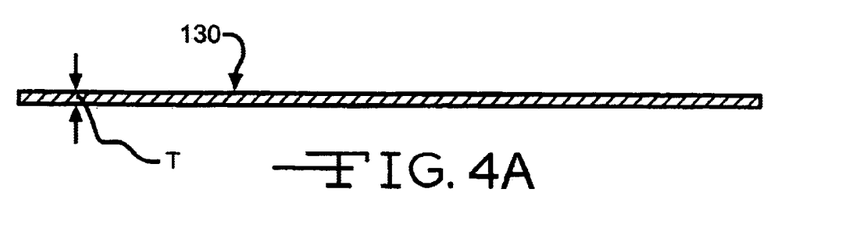
FIG. 4A is a sectional view of the wheel disc blank taken along line 4A—4A of FIG. 4.
Figure 12:
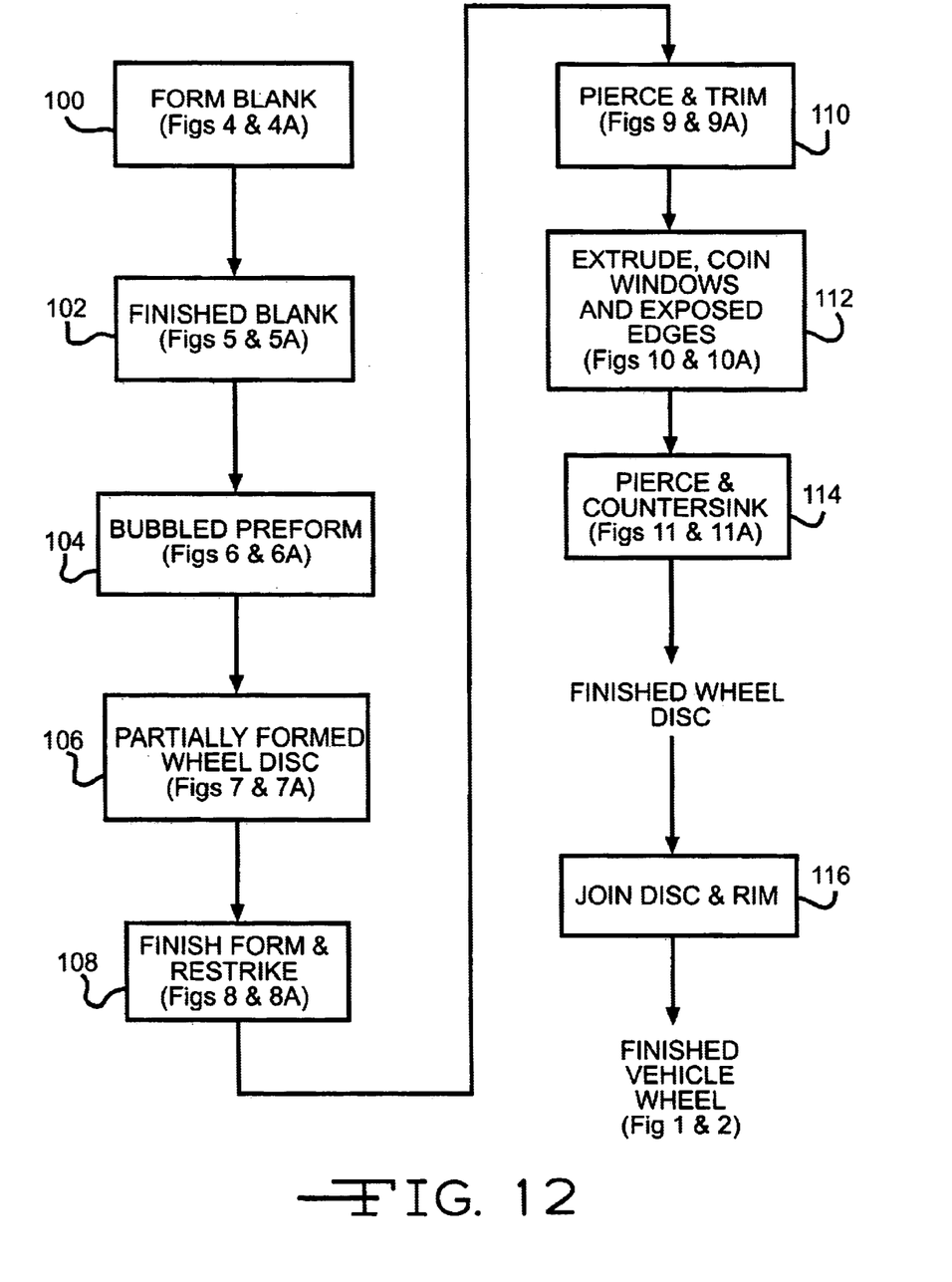
FIG. 12 is a block diagram illustrating a sequence of steps for producing a full face fabricated vehicle wheel in accordance with the present invention.

Referring now FIG. 12, there is illustrated a block diagram showing a sequence of steps for producing the full face fabricated vehicle wheel 10 of the present invention. Initially, in step 100, a flat sheet of suitable material, such as for example steel (not shown), is subjected to a metal forming operation to produce an initial wheel disc blank 130, as shown in FIGS. 4 and 4A. The wheel disc blank 130 is a generally round, flat disc blank and is preferably formed by a blanking or stamping operation. The wheel disc blank 130 preferably defines a generally uniform wheel disc blank thickness T.

Figure 5:
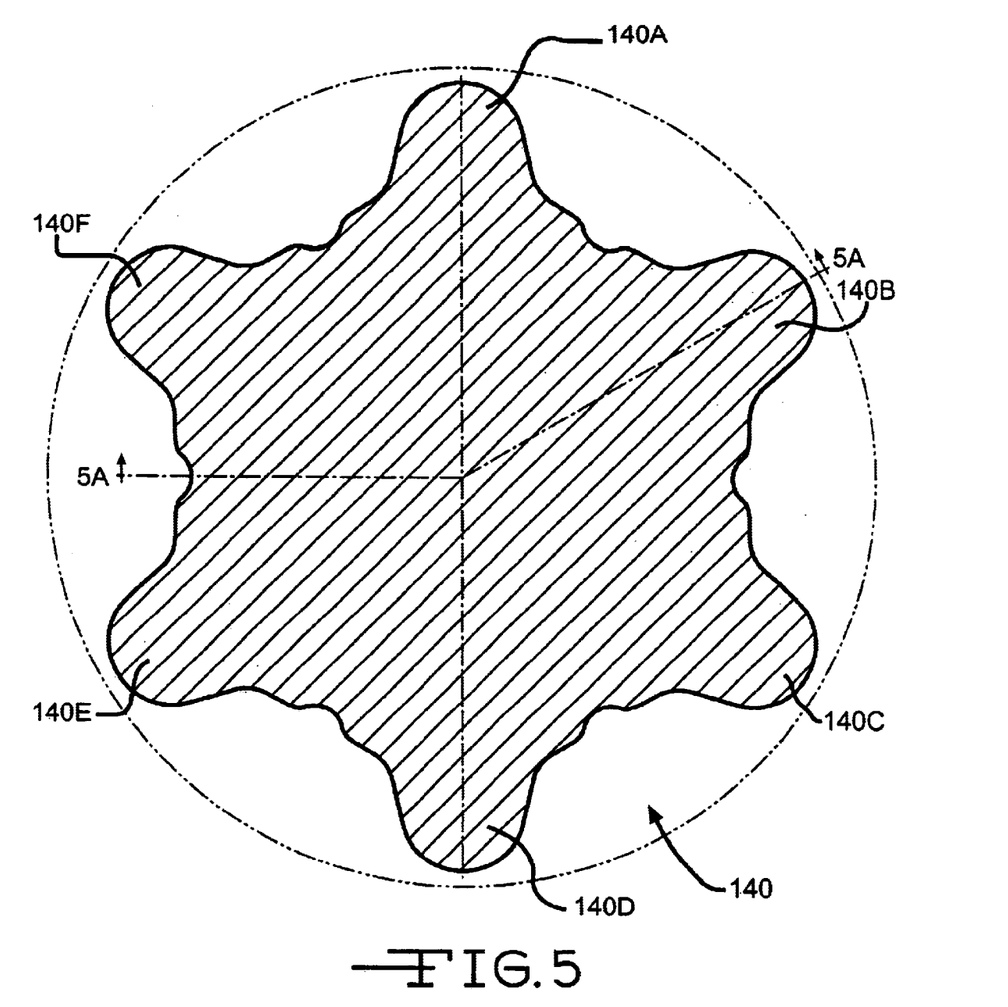
FIG. 5 is a plan view showing the stamping of the wheel disc blank in order to produce a finished wheel disc blank in accordance with this invention.
Figure 5A:
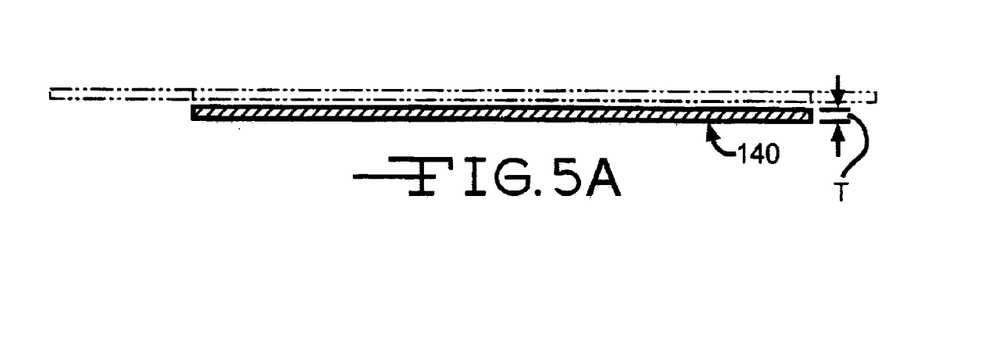
FIG. 5A is a sectional view of the finished wheel disc blank taken along line 5A—5A of FIG. 5.

Next, in step 102, the wheel disc blank 130 is subjected to a metal forming operation to produce a finished wheel disc blank 140 having a unique profile, as shown in FIGS. 5 and 5A. As shown therein, in the illustrated embodiment the finished wheel disc blank 140 includes six outwardly extending or protruding spoke portions 140A–140F which are equally spaced circumferentially about the wheel disc blank 140 and are identical to one another. The wheel disc blank 140 is preferably formed by a blanking or stamping operation. Alternatively, the spacing, number and/or configuration of the wheel disk blank 140 and/or the outwardly extending spoke portions 140A–140F can be other than illustrated if so desired. Also, the initial wheel disc blank 130 and/or the finished wheel disc blank 140 can be formed by an other suitable processes if so desired.

Figure 6:
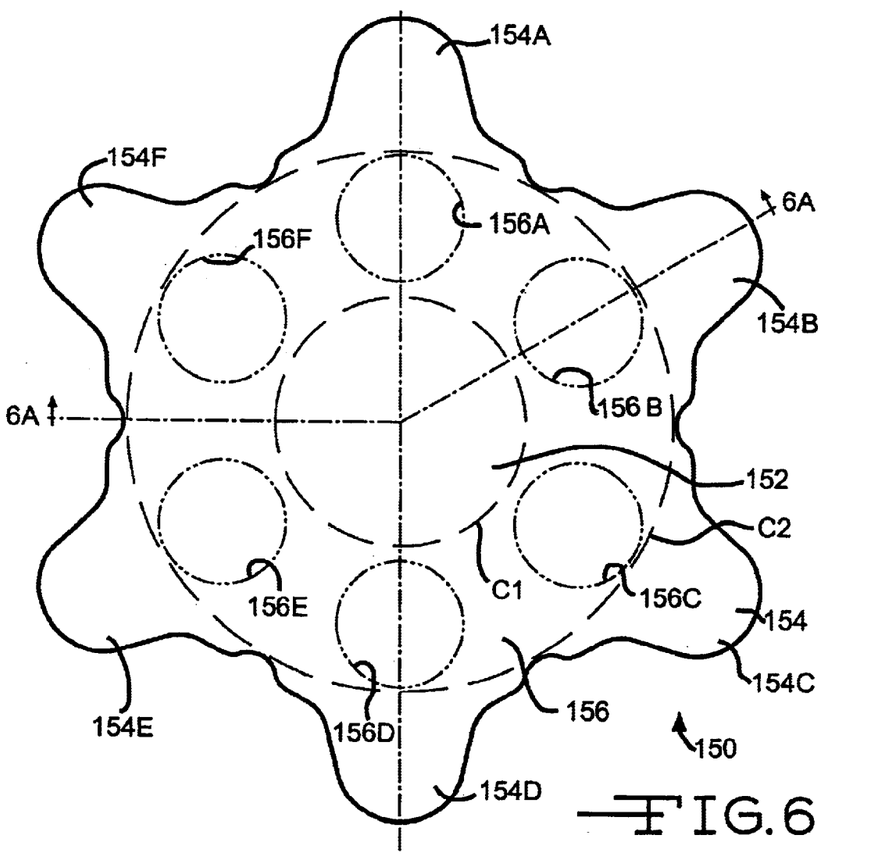
FIG. 6 is a plan view showing the stamping of the finished wheel disc blank in order to produce a bubble shaped wheel disc preform in accordance with this invention.
Figure 6A:
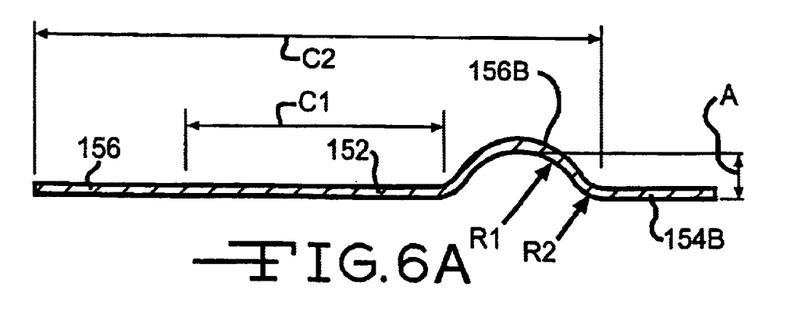
FIG. 6A is a sectional view of the bubble shaped wheel disc preform taken along line 6A—6A of FIG. 6.

Following this, the finished wheel disc blank 140 is subjected to a metal forming operation to produce a generally "bubble" shaped wheel disc preform 150 during step 104, as shown in FIGS. 6 and 6A. The bubble shaped wheel disc preform 150 includes a generally flat inner portion 152 defined within a boundary of a first or inner circle C1, a generally flat outer spoke portion 154 defined outside a boundary of a second or outer circle C2, and an intermediate spoke portion 156 defined in the region between the first inner circle C1 and the second outer circle C2.

The intermediate portion 156 of the bubble shaped wheel disc preform 150 includes six raised or generally globe shaped portions 156A–156F, and the outer portion 154 has six outwardly extending portions 154A–154F. Each of the globe shaped portions 156A–156F define a first radius R1 and a second radius R2 and extend from the flat inner portion 152 a distance A.

In the illustrated embodiment, the globe shaped portions 156A–156F are equally spaced circumferentially about the bubble shaped wheel disc preform 150 and are identical to one another. Similarly, the outer spoke portions 154A–154F are equally spaced circumferentially about the bubble shaped wheel disc preform 150 and are identical to one another. The bubble shaped wheel disc preform 150 is preferably formed by a stamping operation. Alternatively, the spacing, number and/or configuration of the bubble shaped wheel disc preform 150 and/or the globe shaped spoke portions 156A–156F and/or the outwardly extending spoke portions 154A–154F can be other than illustrated if so desired.

Figure 7:
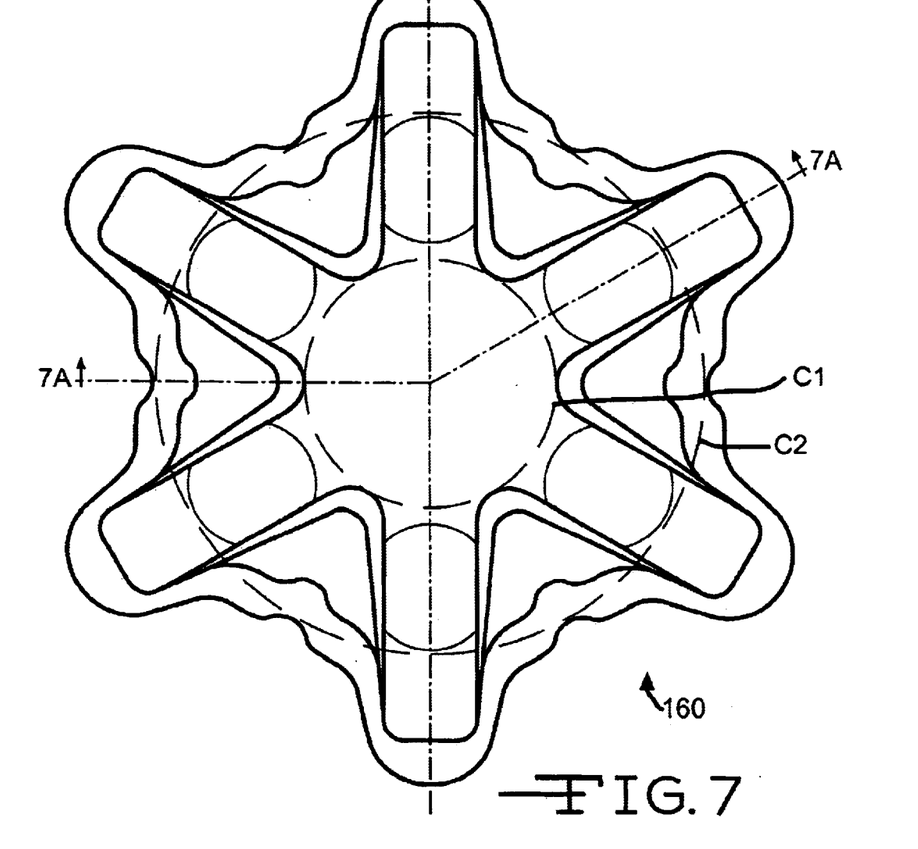
FIG. 7 is a plan view showing the stamping of the bubble shaped wheel disc preform in order to produce a partially formed wheel disc in accordance with the present invention.
Figure 7A:
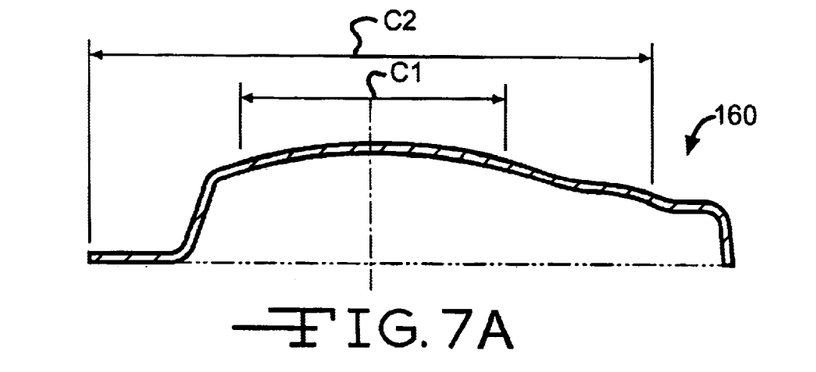
FIG. 7A is a sectional view of the partially formed wheel disc taken along line 7A—7A of FIG. 7.
Figure 8:
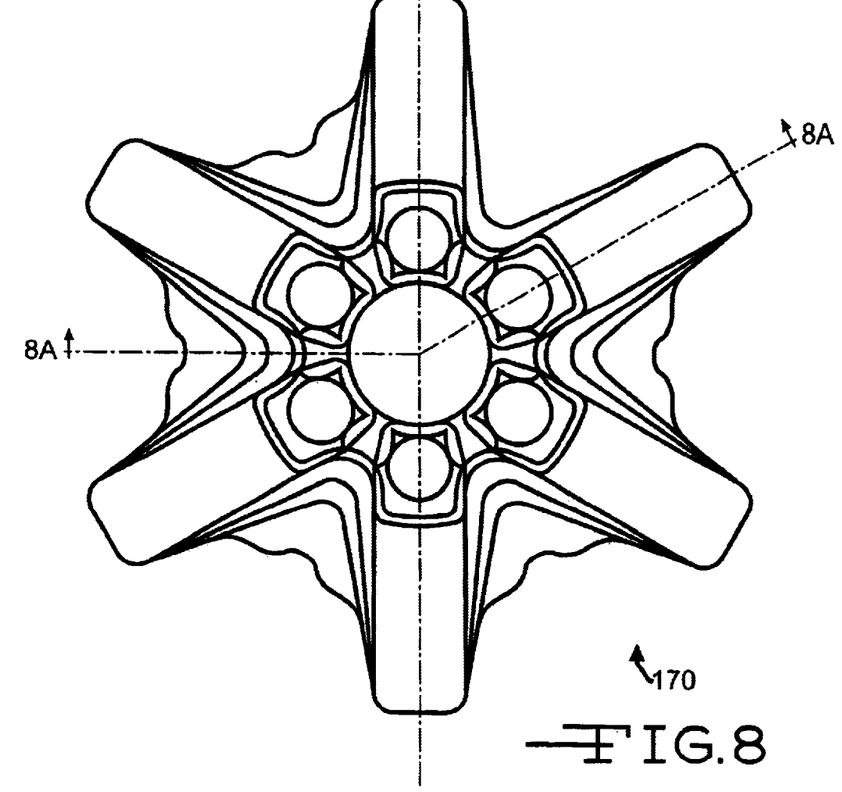
FIG. 8 is a plan view showing the restriking of the wheel disc in order to produce a wheel disc in accordance with the present invention.
Figure 8A:
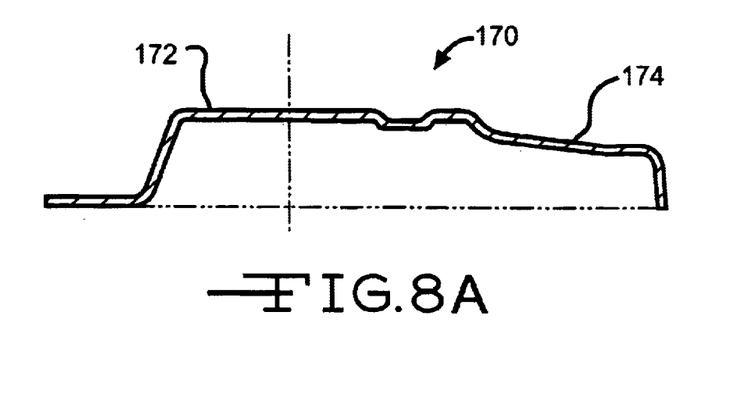
FIG. 8A is a sectional view of the wheel disc taken along line 8A—8A of FIG. 8.

In step 106, the bubble shaped wheel disc preform 150 is subjected to a metal forming operation to produce a partially formed wheel disc 160, as shown in FIGS. 7 and 7A. As shown therein, the partially formed wheel disc 160 has a desired shape or profile and is preferably formed by a stamping operation. In particular, during step 106, the spokes 44 of the finished wheel disc 40 begin to take shape and materialize in the partially formed wheel disc 160. Following this, in step 108, the partially formed wheel disc 160 is subjected to a metal forming operation to produce a wheel disc 170, as shown in FIGS. 8 and 8A. To accomplish this, the wheel disc 160 is preferably restriked by a stamping operation to produce the wheel disc 170. The wheel disc 170 includes a generally "flattened" inner surface 172 and an outer annular portion 174.

Figure 9:
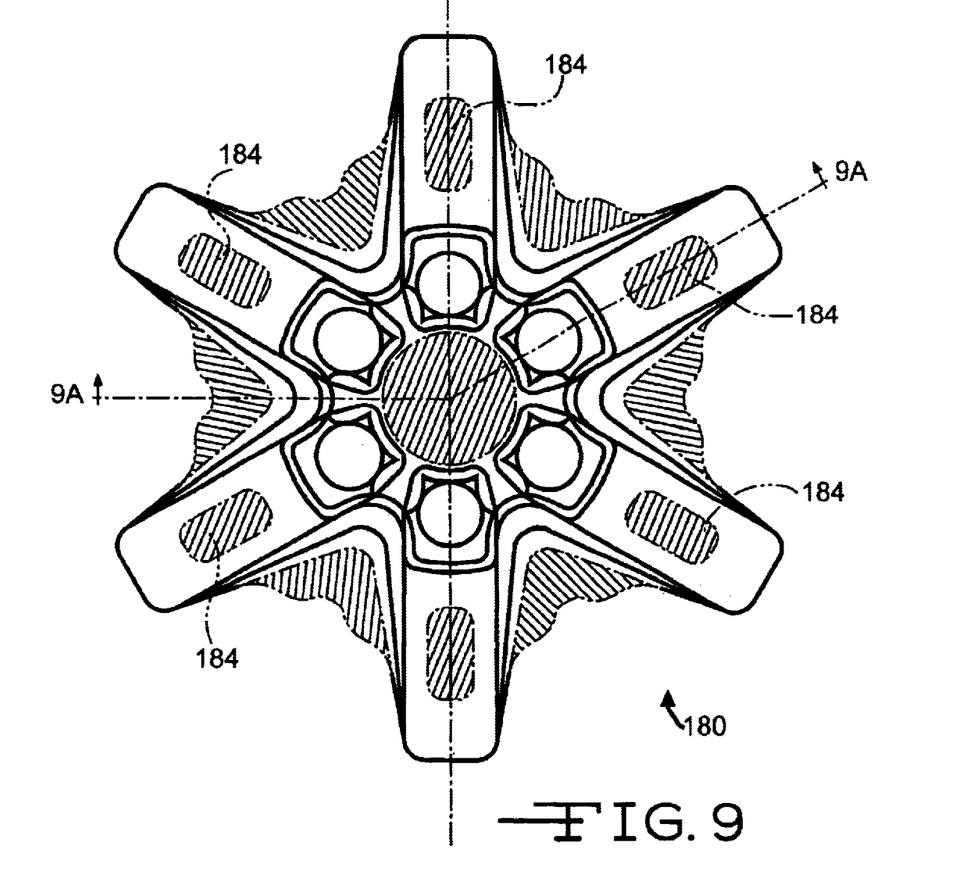
FIG. 9 is a plan view showing the piercing of the windows and the hub hole and the trimming of the outer ends of the wheel disc in order to produce a wheel disc in accordance with the present invention.
Figure 9A:
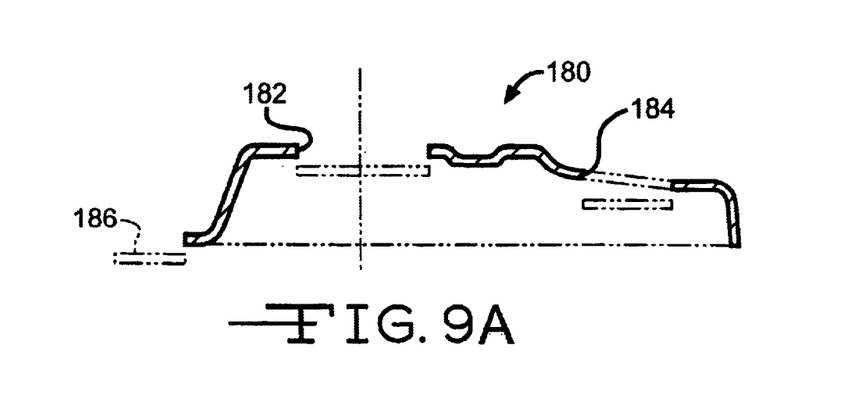
FIG. 9A is a sectional view of the wheel disc taken along line 9A—9A of FIG. 9.

Next, in step 110, the wheel disc 170 is subjected to a metal forming operation to produce a wheel disc 180 shown in FIGS. 9 and 9A. During step 110, a center pilot aperture 182 is formed in the wheel disc 180, openings or windows 184 are formed in the wheel disc 180, and portions 186 are removed from the outer annular portion 174 of the wheel disc 170. Preferably, the center hub hole 182 and the windows 184 are formed by a piercing operation and the portions 186 are removed by a trimming operation.

Figure 10:
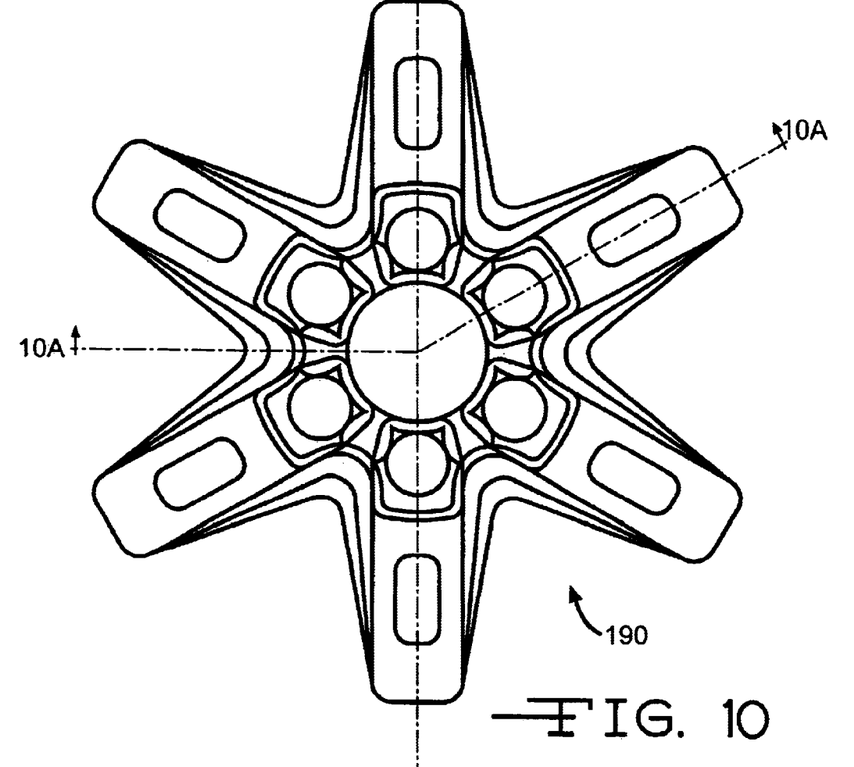
FIG. 10 is a plan view showing the extruding of the wheel disc in order to produce a wheel disc in accordance with the present invention.
Figure 10A:
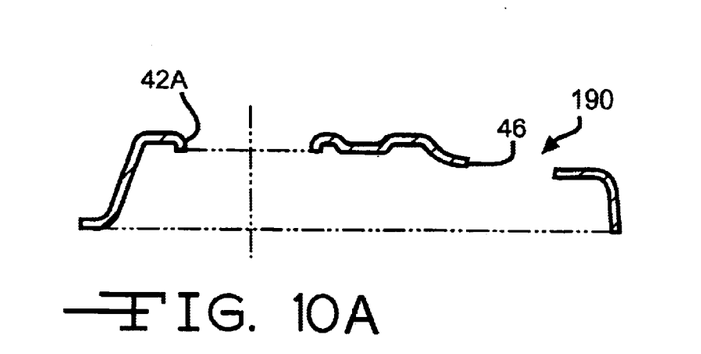
FIG. 10A is a sectional view of the wheel disc taken along line 10A—10A of FIG. 10.

Following this, in step 112, the wheel disc 180 is subjected to a metal forming operation to produce a wheel disc 190, as shown in FIGS. 10 and 10A. During step 112, the center pilot aperture 182 is further processed to produce the finished center pilot aperture 42A. Preferably, the finished pilot aperture 42A is formed by an extruding operation. Also, during step 112, the edge of the windows 184 are preferably coined to produce the finished windows 46, and all the exposed edges of the wheel disc 180 are also preferably coined to remove any sharp edges from the wheel disc 190.

Figure 11:
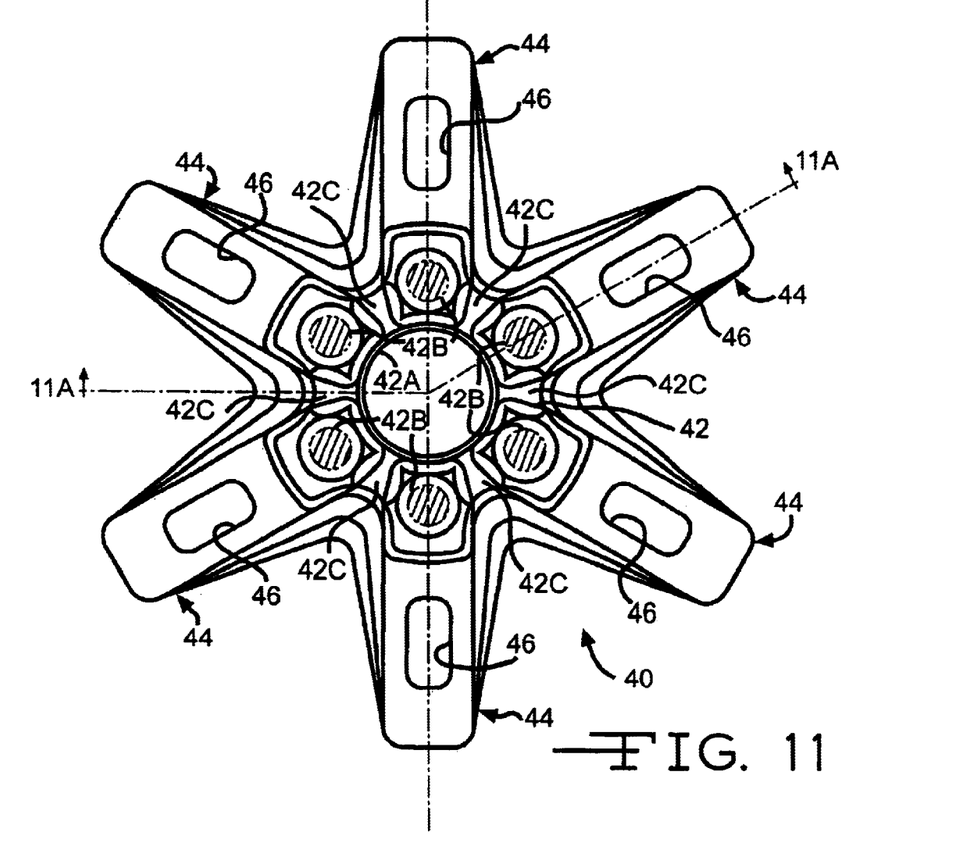
FIG. 11 is a plan view showing the piercing of the lug bolt receiving holes and the countersinking of hub hole in the wheel disc in order to produce a finished wheel disc in accordance with the present invention.
Figure 11A:
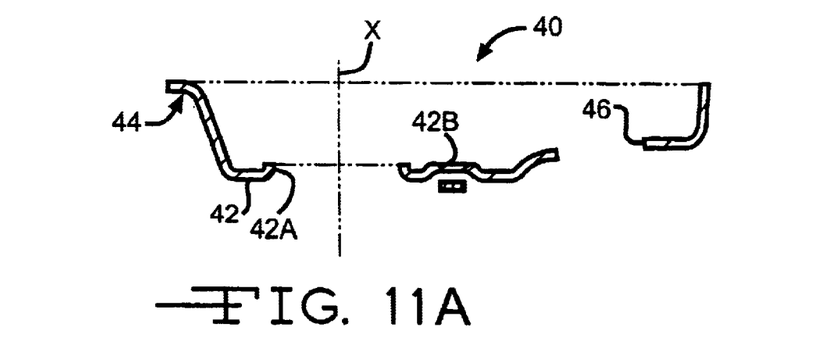
FIG. 11A is a sectional view of the finished wheel disc taken along line 11A—11A of FIG. 11.

Next, the wheel disc 190 is subjected to final metal forming operation in step 114 to produce the finished wheel disc 40, shown in FIGS. 1, 2, 11 and 11A, of the present invention. In particular, during step 114, the lug bolts receiving holes 42B are formed in the wheel disc 40. Preferably, the lug bolt receiving holes 42B are formed by a piercing operation followed by a countersinking operation. As shown in FIGS. 11 and 11A, the finished wheel disc 40 includes the centrally located wheel mounting surface 42, the spokes 44, the pilot aperture 42A, the lug bolt receiving holes 42B, and the openings 46. Following this, in step 116, the finished wheel disc 40 is joined to the wheel rim 20 as described above to produce the finished fabricated vehicle wheel 10. Alternatively, the number, type of metal forming and/or the sequence of the steps 100–116 can be other than illustrated and described above if so desired.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A method for producing a fabricated vehicle wheel comprising the steps of:
   (a) providing a wheel rim defining a rim axis and including an inboard tire bead seat retaining flange, an inboard tire bead seat, a generally axially extending well portion, an outboard tire bead seat and an outboard tire bead seat retaining flange;
   (b) providing a wheel disc blank;
   (c) subjecting the wheel disc blank to a metal forming operation to produce a partially formed wheel disc having a plurality of individual spaced apart outwardly extending spoke portions which are spaced circumferentially about the disc blank;
   (d) subjecting the partially formed wheel disc to a metal forming operation to produce a generally bubble shaped wheel disc preform, the wheel disc preform including an inner mounting portion, a plurality of individual spaced apart outer spoke portions, and an intermediate spoke portion defined in the region between the inner mounting portion and outer spoke portions, the intermediate spoke portion including a plurality of generally globe shaped spoke portions having a generally semi-spherical shape;
   (e) subjecting the generally bubble shaped wheel disc preform to one or more metal forming operations to produce a finished wheel disc, the finished wheel disc including a centrally located wheel mounting surface and a plurality of individual spaced apart finish formed outwardly extending spokes having a generally non globe shaped shape; and
   (f) securing the wheel disc and the wheel rim together to produce the fabricated vehicle wheel.

2. The method according to claim 1 wherein step (e) includes one or more of the following steps: stamping the wheel disc to a desired shape; restriking the wheel disc; forming a center pilot aperture in the wheel mounting surface of the wheel disc, forming at least one window in each of the spokes of the wheel disc; trimming outer portions from the wheel disc; coining the edge of the windows; and forming a plurality of lug bolts receiving holes in the wheel mounting surface of the wheel disc.

3. The method defined in claim 1 wherein step (e) includes forming a center hub hole and plurality of lug bolt receiving holes in the wheel mounting surface of the wheel disc.

4. The method defined in claim 3 wherein step (e) includes forming at least one window in each of the spokes of the wheel disc.

5. The method defined in claim 1 wherein the wheel rim of step (a) is formed from steel, magnesium, titanium, aluminum or alloys thereof and the wheel disc of step (b) is formed from steel, magnesium, titanium, aluminum or alloys thereof.

6. The method defined in claim 1 wherein prior to step (f), the step of forming a plurality of holes in the wheel rim and a plurality of holes in the spokes of the finished wheel disc is peformed, and step (f) further includes aligning the wheel rim holes and the wheel disc spoke holes and installing a fastener in the aligned holes to secure the wheel rim and the wheel disc together.

7. The method defined in claim 1 wherein step (d) includes subjecting the partially formed wheel disc to a metal forming operation to produce a generally bubble shaped wheel disc preform, the wheel disc preform including an inner mounting portion, six individual spaced apart outer spoke portions, and an intermediate spoke portion defined in the region between the inner mounting portion and outer spoke portions, the intermediate spoke portion including six generally globe shaped spoke portions having a generally semi-spherical shape.

8. The method defined in claim 1 wherein step (e) includes forming a plurality of embossed ribs in the wheel mounting surface of the wheel disc.

9. The method defined in claim 1 wherein each spoke of the finished wheel disc produced in step (e) includes a generally flat rear wall having at least one window formed therein; a pair of opposed side walls extending from the rear wall and operative to connect the associated spoke to the wheel mounting surface; and an outermost end wall extending from the rear wall which defines a mounting flange for securing the wheel rim and the wheel disc together.

10. The method defined in claim 9 wherein the side walls extend generally non-parallel to one another and define a varying spoke width.

11. A fabricated vehicle wheel produced according to the method defined in claim 1.

12. A method for producing a fabricated vehicle wheel comprising the steps of:
   (a) providing a full wheel rim defining a rim axis and including an inboard tire bead seat retaining flange, an inboard tire bead seat, a generally axially extending well portion, an outboard tire bead seat and an outboard tire bead seat retaining flange;
   (b) providing a wheel disc blank;
   (c) subjecting the wheel disc blank to a metal forming operation to produce a partially formed wheel disc having a plurality of individual spaced apart outwardly extending spoke portions which are spaced circumferentially about the disc blank;
   (d) subjecting the partially formed wheel disc to a metal forming operation to produce a generally bubble shaped wheel disc preform, the wheel disc preform including an inner mounting portion, a plurality of individual spaced apart outer spoke portions, and an intermediate spoke portion defined in the region between the inner mounting portion and outer spoke portions, the intermediate spoke portion including a plurality of generally globe shaped spoke portions having a generally semi-spherical shape;
   (e) subjecting the wheel disc preform to one or more metal forming operations to produce a finished wheel disc, the finished wheel disc including a centrally located wheel mounting surface and a plurality of individual spaced apart finish formed outwardly extending spokes having a generally non globe shaped shape, the centrally located wheel mounting surface having a center hub hole and plurality of lug bolt receiving holes formed therein and each of the spokes having at least one window formed; and
   (f) securing the wheel disc and the wheel rim together to produce the fabricated vehicle wheel.

13. The method defined in claim 12 wherein the wheel rim of step (a) is formed from steel, magnesium, titanium, aluminum or alloys thereof and the wheel disc of step (b) is formed from steel, magnesium, titanium, aluminum or alloys thereof.

14. The method defined in claim 12 wherein prior to step (f), the step of forming a plurality of holes in the wheel rim and a plurality of holes in the spokes of the finished wheel disc is performed, and step (f) further includes aligning the wheel rim holes and the wheel disc spoke holes and installing a fastener in the aligned holes to secure the wheel rim and the wheel disc together.

15. The method defined in claim 12 wherein each spoke of the finished wheel disc produced in step (e) includes a generally flat rear wall having at least one window formed therein; a pair of opposed side walls extending from the rear wall and adapted to connect the associated spoke to the wheel mounting surface; and an outermost end wall extending from the rear wall which defines a mounting flange for securing the wheel rim and the wheel disc together.

16. The method defined in claim 12 wherein step (d) includes subjecting the partially formed wheel disc to a metal forming operation to produce a generally bubble shaped wheel disc preform, the wheel disc preform including an inner mounting portion, six individual spaced apart outer spoke portions, and an intermediate spoke portion defined in the region between the inner mounting portion and outer spoke portions, the intermediate spoke portion including six generally globe shaped spoke portions having a generally semi-spherical shape.

17. A fabricated vehicle wheel produced according to the method defined in claim 12.

18. A method for producing a fabricated bead-seat attached vehicle wheel comprising the steps of:
(a) providing a full wheel rim defining a rim axis and including an inboard tire bead seat retaining flange, an inboard tire bead seat, a generally axially extending well portion, an outboard tire bead seat and an outboard tire bead seat retaining flange;
(b) providing a wheel disc blank;
(c) subjecting the wheel disc blank to a metal forming operation to produce a partially formed wheel disc having a plurality of individual spaced apart outwardly extending spoke portions which are spaced circumferentially about the disc blank;
(d) subjecting the partially formed wheel disc to a metal forming operation to produce a generally bubble shaped wheel disc preform, the wheel disc preform including an inner mounting portion, a plurality of individual spaced apart outer spoke portions, and an intermediate spoke portion defined in the region between the inner mounting portion and outer spoke portions, the intermediate spoke portion including a plurality of generally globe shaped spoke portions having a generally semi-spherical shape;
(e) subjecting the wheel disc preform to one or more metal forming operations to produce a finished wheel disc, the finished wheel disc including a centrally located wheel mounting surface and a plurality of individual spaced apart finish formed outwardly extending spokes having a generally non globe shaped shape, the centrally located wheel mounting surface having a center hub hole, a plurality of lug bolt receiving holes, and a plurality of embossed ribs, each spoke including a generally flat rear wall having at least one window formed therein, a pair of opposed side walls extending from the rear wall and operative to connect the associated spoke to the wheel mounting surface, and an outermost end wall extending from the rear wall which defines a mounting flange;
(f) forming a plurality of holes in the wheel rim and at least one hole in each mounting flange of each spoke of the finished wheel disc;
(g) aligning the wheel rim holes and the wheel disc spoke holes; and
(h) installing a fastener in the aligned holes to secure the wheel rim and the wheel disc together to produce the fabricated bead seat attached vehicle wheel.

19. The method defined in claim 18 wherein the side walls extend generally non-parallel to one another and define a varying spoke width.

20. A fabricated bead-seat attached vehicle wheel produced according to the method defined in claim 18.

* * * * *